UNITED STATES PATENT OFFICE 2,381,877

1-METHOXY-2-AMINO-4-NITRO-5-METHYL-BENZENE AND PROCESS OF MAKING THE SAME

Marion Scott Carpenter, Nutley, N. J., assignor to Burton T. Bush, Inc., New York, N. Y., a corporation of New Jersey No Drawing. Application April 3, 1942, Serial No. 437,527

4 Claims. (Cl. 260—575)

This invention relates to a new chemical substance having the following probable structural formula:

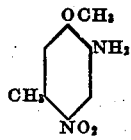

and to a novel process for making the same.

This substance may be obtained, for example, from 1-methoxy-2,4-dinitro-5-methyl benzene:

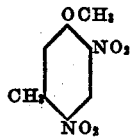

This is a known material having no observed utilitarian value.

An object of this invention is to obtain useful products from a material having no known economic value. Another object is to provide a new chemical substance. A further object is to provide a new dye and medicinal intermediate. These objects and others which will be apparent to those skilled in the art, are accomplished by this invention as indicated hereinafter.

I have found that the foregoing objects can be attained by reducing 1-methoxy-2,4-dinitro-5-methyl benzene to 1-methoxy-2-amino-4-nitro-5-methyl benzene. This new substance is crystalline at ordinary temperatures and possesses properties which render it commercially usable. In this connection, the novel material may be employed, for example, as a dyestuff intermediate and as an intermediate for certain medicinal chemicals, for example, those of the phenacetin type.

The following example, in which all parts are by weight, is given in order to illustrate how this invention may be practiced.

EXAMPLE

*Preparation of 1-methoxy-2-amino-4-nitro-5-methyl benzene*

A suspension of 212 parts of 1-methoxy-2,4-dinitro-5-methyl benzene in 2000 parts of water was introduced into a suitable reaction chamber provided with the usual equipment for carrying out chemical reactions under reflux. After the suspension was heated to about 95° C. a solution consisting of 256 parts of crystalline sodium sulfide, 106 parts of soda ash and 900 parts of water was added thereto.

The reaction mixure was continually agitated during the just-mentioned addition step and for 30 minutes after the completion thereof. The temperature of the reaction mixture was kept at 95°–100° C. during the same period. After the agitation was stopped the contents of the reaction chamber were cooled to room temperature, that is, to 20°–25° C., filtered, and the crystalline material was washed well with water.

The solid material was then purified. This was effected by dissolving it in dilute aqueous hydrochloric acid solution, removing acid-insoluble matter and making the acid solution alkaline with sodium hydroxide. The resulting crystals were filtered, washed alkali-free with water, and then dried.

There were thus obtained 120 parts, equivalent to a yield of about 65% of theoretical, of 1-methoxy-2-amino-4-nitro-5-methyl benzene. This is a orange-colored material having a melting point of 132°–133° C.

This novel material may be employed in the manufacture of a large number of dye-stuffs, for example, those of the azo type. When diazotized and coupled with acetoacetanilide, the novel material yielded a tan Hansa dye, which in alcohol solution is brownish-orange.

While this invention has been described in detail as to the method of preparing my novel product, it is to be understood that changes may be made pertaining thereto, and hence no limitations on the invention are intended other than those imposed by the scope of the appended claims, construed as broadly as permissible in view of the prior art.

What is claimed is:

1. A chemical compound having the following probable structural formula:

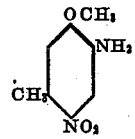

2. The process of making 1-methoxy-2-amino-4-nitro-5-methylbenzene from 1-methoxy-2,4-dinitro-5-methylbenzene, which comprises reducing the latter substance with an alkali metal sulfide in an alkaline aqueous medium.

3. The process of making 1-methoxy-2-amino-4-nitro-5-methylbenzene, which comprises reacting 1-methoxy-2,4-dinitro-5-methylbenzene with aqueous sodium sulfide.

4. The process of making 1-methoxy-2-amino-4-nitro-5-methylbenzene, which comprises adding an aqueous solution of sodium sulfide and an alkali to a suspension of 1-methoxy-2,4-dinitro-5-methylbenzene in water maintained at a temperature of not less than about 90° C.

MARION SCOTT CARPENTER.